United States Patent
Lou et al.

(10) Patent No.: US 9,704,529 B1
(45) Date of Patent: Jul. 11, 2017

(54) CONCURRENT LASER INDUCED WRITER PROTRUSION CORRECTION AND LASER WRITEABILITY CALIBRATION

(71) Applicant: Seagate Technology LLC, Cupertino, CA (US)

(72) Inventors: Huazhou Lou, Eden Prairie, MN (US); Jason Riddering, Prior Lake, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/233,447

(22) Filed: Aug. 10, 2016

(51) Int. Cl.
| | |
|---|---|
| *G11B 5/02* | (2006.01) |
| *G11B 7/1267* | (2012.01) |
| *G11B 5/09* | (2006.01) |
| *G11B 7/1263* | (2012.01) |
| *G11B 5/00* | (2006.01) |

(52) U.S. Cl.
CPC .............. *G11B 7/1267* (2013.01); *G11B 5/09* (2013.01); *G11B 7/1263* (2013.01); *G11B 2005/0021* (2013.01)

(58) Field of Classification Search
CPC ............ G11B 2005/0021; G11B 5/314; G11B 5/6005; G11B 5/59633; G11B 5/54; G11B 5/012; G11B 27/36; G11B 5/3903
USPC ............ 360/31, 25, 75, 59, 313; 369/13.13, 369/13.33, 13.32
See application file for complete search history.

(56) References Cited

U.S. PATENT DOCUMENTS

| | | | |
|---|---|---|---|
| 7,995,425 B2 | 8/2011 | Schreck et al. | |
| 8,456,643 B2 | 6/2013 | Prabhakaran et al. | |
| 8,456,980 B1 | 6/2013 | Thayamballi | |
| 8,593,915 B2 | 11/2013 | Schreck et al. | |
| 8,837,071 B2 | 9/2014 | Macken et al. | |
| 8,873,353 B1 | 10/2014 | Riddering | |
| 8,897,104 B1 * | 11/2014 | Yan ........................ | G11B 5/314 369/112.27 |
| 8,908,483 B1 | 12/2014 | Ren et al. | |
| 9,030,773 B2 | 5/2015 | Macken et al. | |
| 2009/0251828 A1 | 10/2009 | Schreck et al. | |
| 2013/0286802 A1 | 10/2013 | Kiely | |

* cited by examiner

*Primary Examiner* — Nabil Hindi
(74) *Attorney, Agent, or Firm* — Hollingsworth Davis, LLC

(57) ABSTRACT

A heat-assisted magnetic recording (HAMR) head includes a reader, a writer, a writer heater, a laser, and a near-field transducer (NFT). A processor is coupled to the head and configured to perform laser writeability calibration of the head. The processor is also configured to concurrently while performing the laser writeability calibration, correct for laser induced writer protrusion (LIWP) at a writer/NFT region of the head using writer clearance calculations based on reader clearance measurements.

20 Claims, 13 Drawing Sheets

US 9,704,529 B1

CONCURRENT LASER INDUCED WRITER PROTRUSION CORRECTION AND LASER WRITEABILITY CALIBRATION

SUMMARY

Various embodiments are directed to a method comprising performing laser writeability calibration of a heat-assisted magnetic recording (HAMR) head, the head comprising a reader, a writer, a writer heater, a laser, and a near-field transducer (NFT). The method involves concurrently while performing the laser writeability calibration, correcting for laser induced writer protrusion (LIWP) at a writer/NFT region of the head using writer clearance calculations based on reader clearance measurements.

Other embodiments are directed to an apparatus comprising a heat-assisted magnetic recording (HAMR) head including a reader, a writer, a writer heater, a laser, and a near-field transducer (NFT). A processor is coupled to the head and configured to perform laser writeability calibration of the head. The processor is also configured to concurrently while performing the laser writeability calibration, correct for laser induced writer protrusion (LIWP) at a writer/NFT region of the head using writer clearance calculations based on reader clearance measurements.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to heat-assisted magnetic recording, which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature having dimensions less than 100 nm (e.g., ~50 nm).

Figure 1:
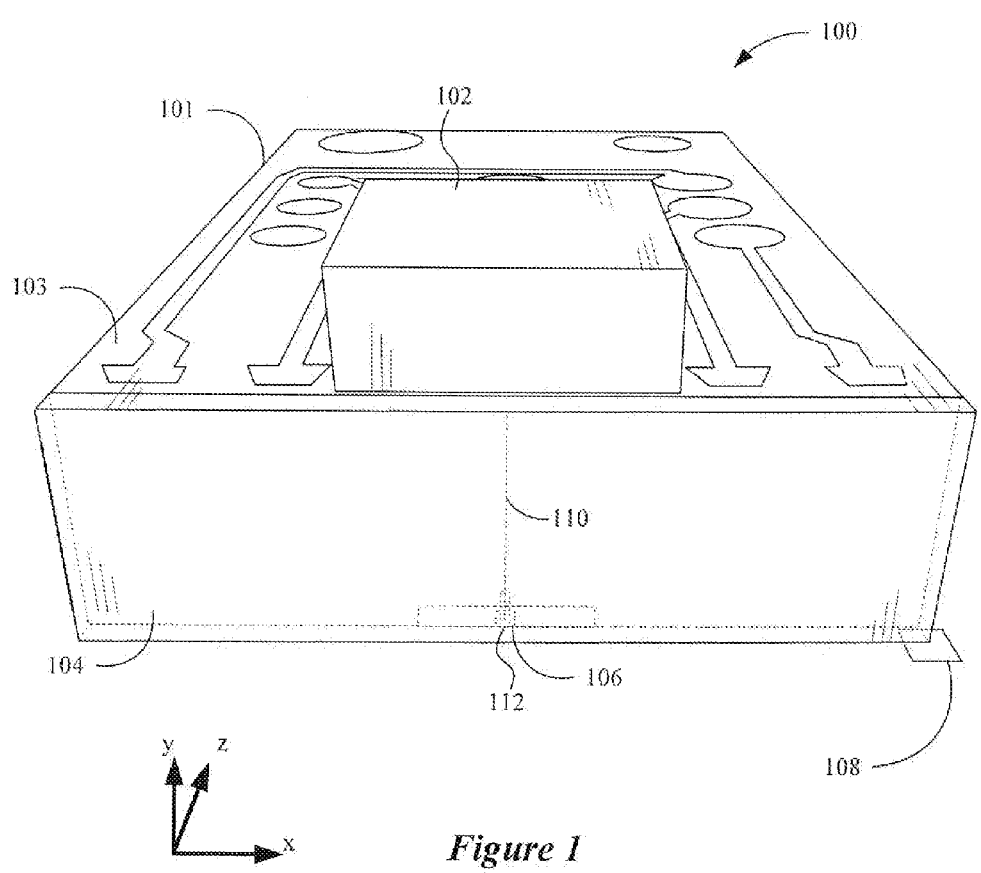
FIG. 1 is a perspective view of a hard drive slider configured for heat-assisted magnetic recording (HAMR) in accordance with embodiments described herein.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, are formed integrally within the slider body 101 (near a trailing edge surface 104 in this example) and function as an optical path that delivers energy from the laser diode 102 to the recording media via a near-field transducer 112. The near-field transducer 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
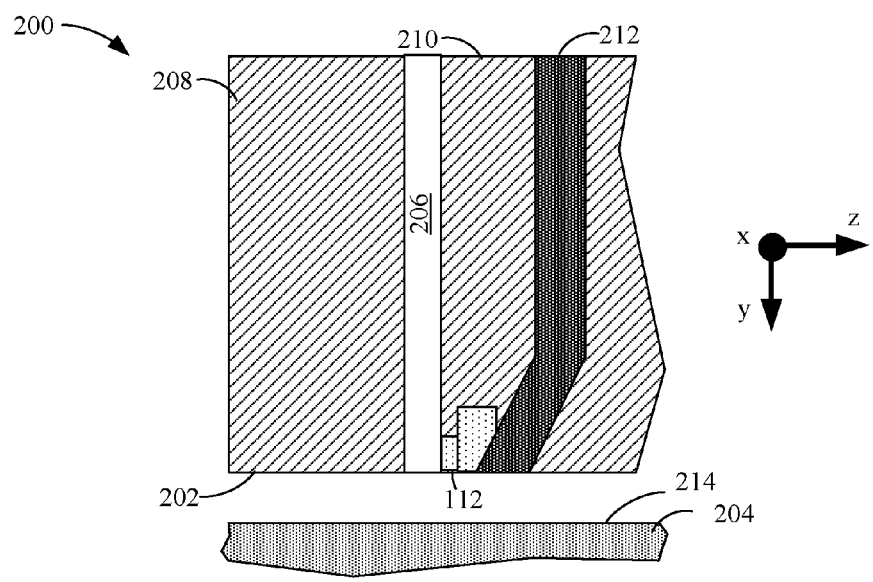
FIG. 2 is a cross-sectional view showing details of a HAMR slider according to various implementations.

With reference now to FIG. 2, a cross-sectional view shows details of a HAMR apparatus 200 according to an example embodiment. Near-field transducer 112 is located proximate a media-facing surface 202 (e.g., ABS), which is held near a magnetic recording media 204 during device operation. In the orientation of FIG. 2, the media-facing surface 202 is arranged parallel to the x-z plane. A waveguide core 206 may be disposed proximate the NFT 112, which is located at or near the media writing surface 214.

The waveguide core 206 surrounded by cladding layers 208, 210. The waveguide core 206 and cladding layers 208, 210 may be made from dielectric materials. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. The NFT 112 delivers surface plasmon enhanced, near-field electromagnetic energy along the y-axis where it exits at the media writing surface 214. This may result in a highly localized hot spot (not shown) on the media surface 214 when the media 204 placed in close proximity to surface 202 of the apparatus 200. Further illustrated in FIG. 2 is a write pole 212 of the read/write head that is located alongside the NFT 112. The write pole 212 generates a magnetic field (e.g., perpendicular field) used in changing the magnetic orientation of the hotspot during writing.

Figure 3:
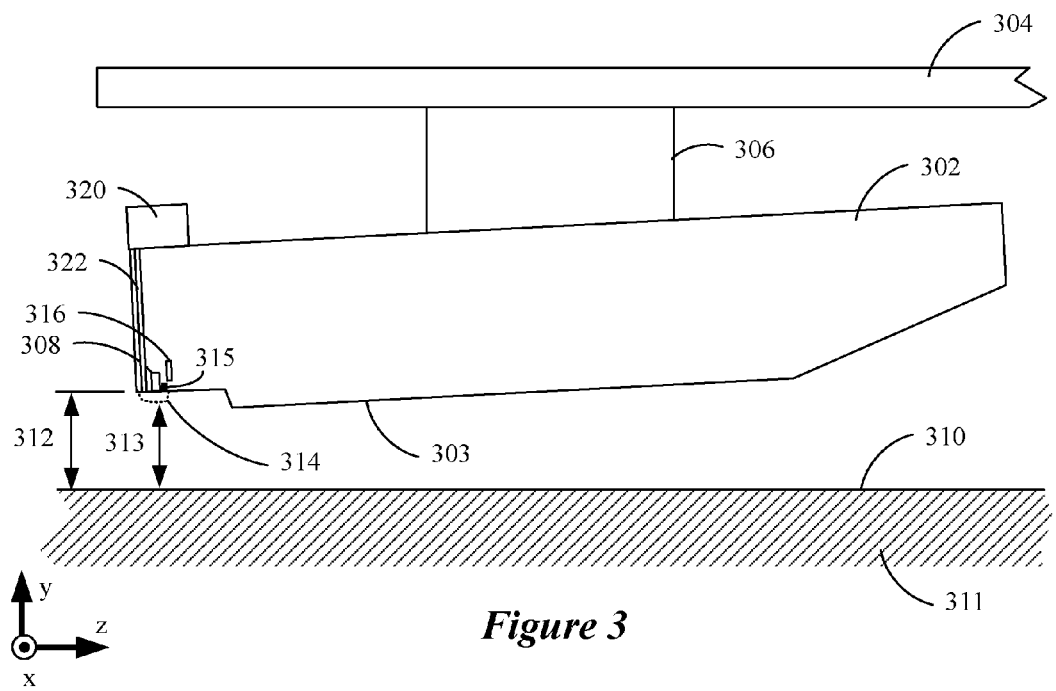
FIG. 3 illustrates a HAMR slider in accordance with some aspects described herein.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via one or more heaters 316. A thermal sensor 315 is shown situated at or near the close point 314 (e.g., adjacent the read/write transducers 308, such as near the near-field transducer) or can be positioned at other location of the ABS 303.

According to various embodiments, the writer of a magnetic recording head includes a corresponding heater, and the reader of the recording head includes a corresponding heater. The writer heater can be powered to cause protrusion of the ABS predominantly in the ABS region at or proximate the writer and the reader heater can be powered to cause protrusion of the ABS predominately in the ABS region at or proximate the reader. Power may be delivered independently to the writer heater and to the reader heaters to adjust the fly height (e.g., clearance) of the slider relative to the surface of the recording medium. One or more thermal sensors may also be situated at various locations (e.g., close points) on the slider at or near the ABS for purposes of monitoring temperature, head-medium spacing changes, and head-medium contact.

Figure 4:
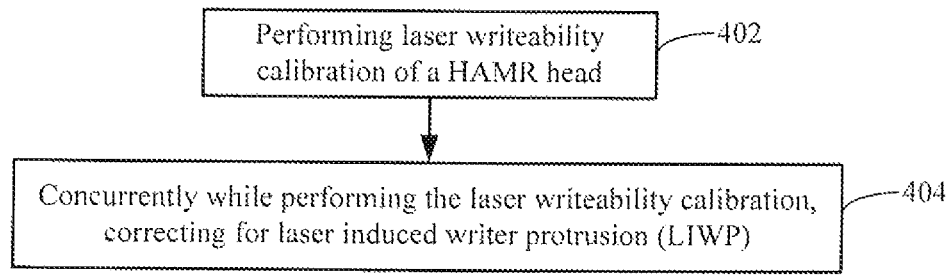
FIG. 4 is a flow chart of a method for concurrently correcting for laser induced writer protrusion and performing laser writeability calibration for a HAMR head in accordance with various embodiments.

FIG. 4 is a flow chart of a method according to various embodiments of the disclosure. The method shown in FIG. 4 involves performing laser writeability calibration of a HAMR head (step 402). The method also involves concurrently, while performing laser writeability calibration, correcting for laser induced writer protrusion (LIWP) (step 404). According to various embodiments, reader clearance measurements are used as a basis for calculating writer clearance during the LIWP correction procedure.

Figure 5:
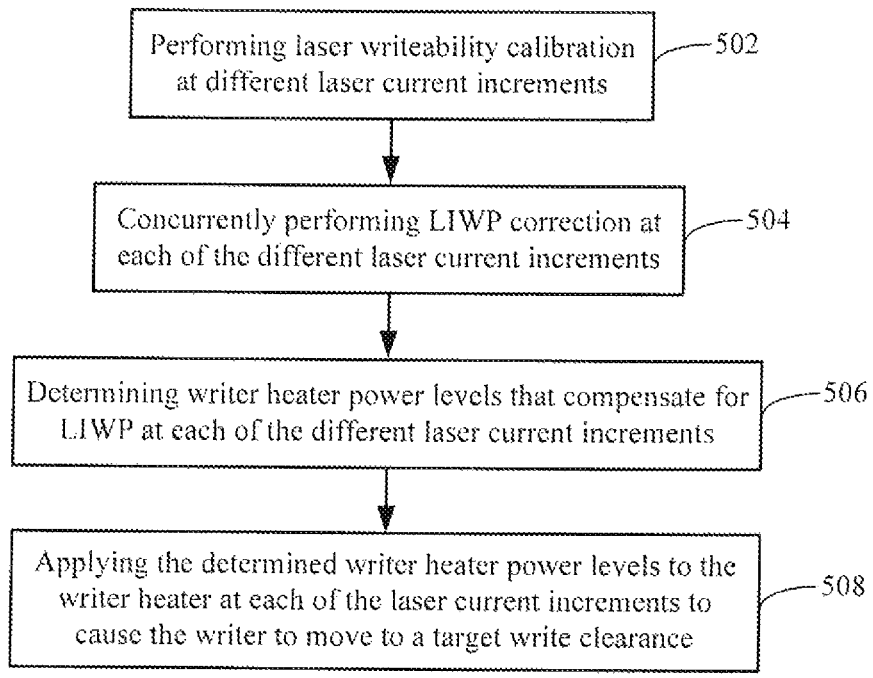
FIG. 5 is a flow chart of a method for concurrently correcting for laser induced writer protrusion and performing laser writeability calibration for a HAMR head in accordance with various embodiments.

FIG. 5 is a flow chart of a method according to various embodiments of the disclosure. The method shown in FIG. 5 involves performing laser writeability calibration at different laser current increments (step 502), and concurrently performing LIWP correction at each of the different laser current increments (step 504). The method also involves determining writer heater power levels that compensate for LIWP at each of the different laser current increments (step 506). The method further involves applying the determined writer heater power levels to the writer heater at each of the laser current increments to cause the writer to move to a target write clearance (step 508).

Figure 15:
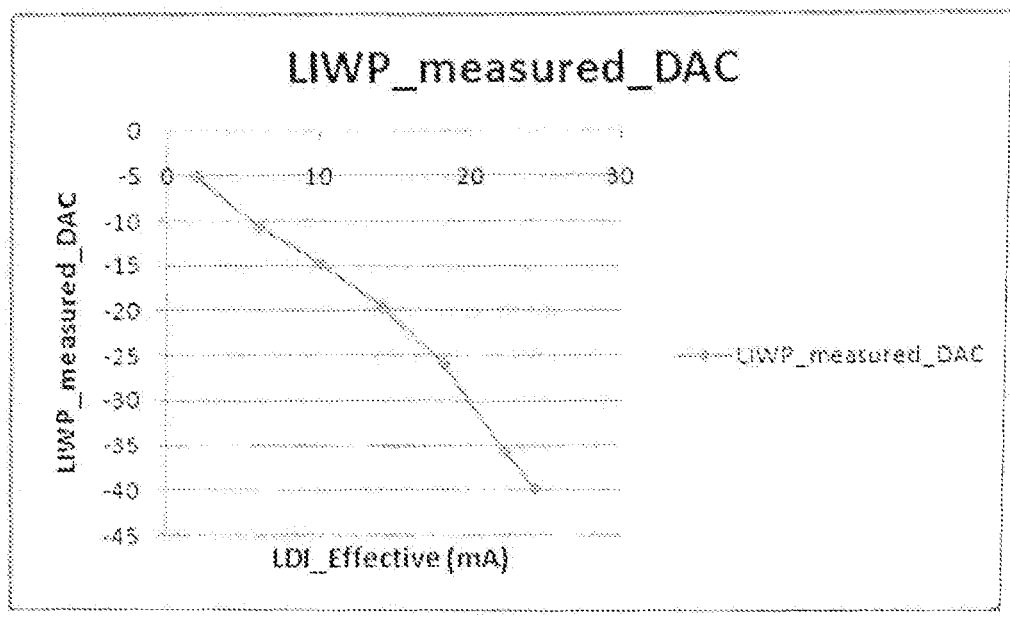
FIG. 15 is a graph showing measured Laser Induced Writer Protrusion LIWP_measured_DAC in terms of writer heater power back off to compensate for LIWP versus laser current associated with a particular step of a method for concurrently correcting for laser induced writer protrusion while performing laser writeability calibration in accordance with various embodiments.

In some embodiments, the method can involve developing a curve of writer heater power levels that compensate for LIWP versus laser current increments (see, e.g., FIG. 15). The method can also involve using the curve to determine a particular writer heater power level that corresponds to a particular laser current increment. Applying the particular writer heater power level to the writer heater when writing with the laser set to the particular laser current increment causes the writer to move to a target writer clearance.

Figure 6A:
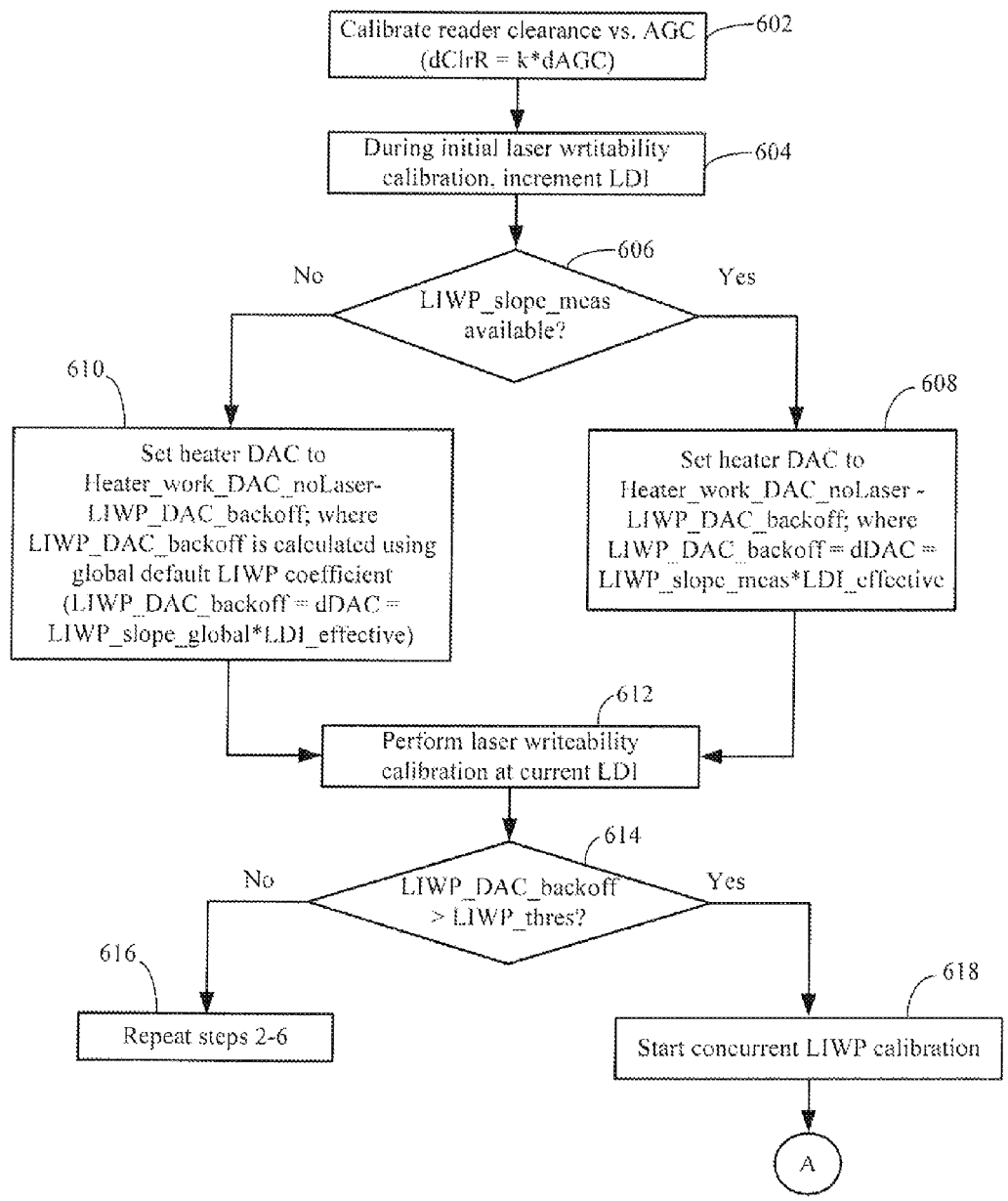
FIGS. 6A-6C are flow charts of a method for concurrently correcting for laser induced writer protrusion and performing laser writeability calibration for a HAMR head in accordance with various embodiments.
Figure 6B:
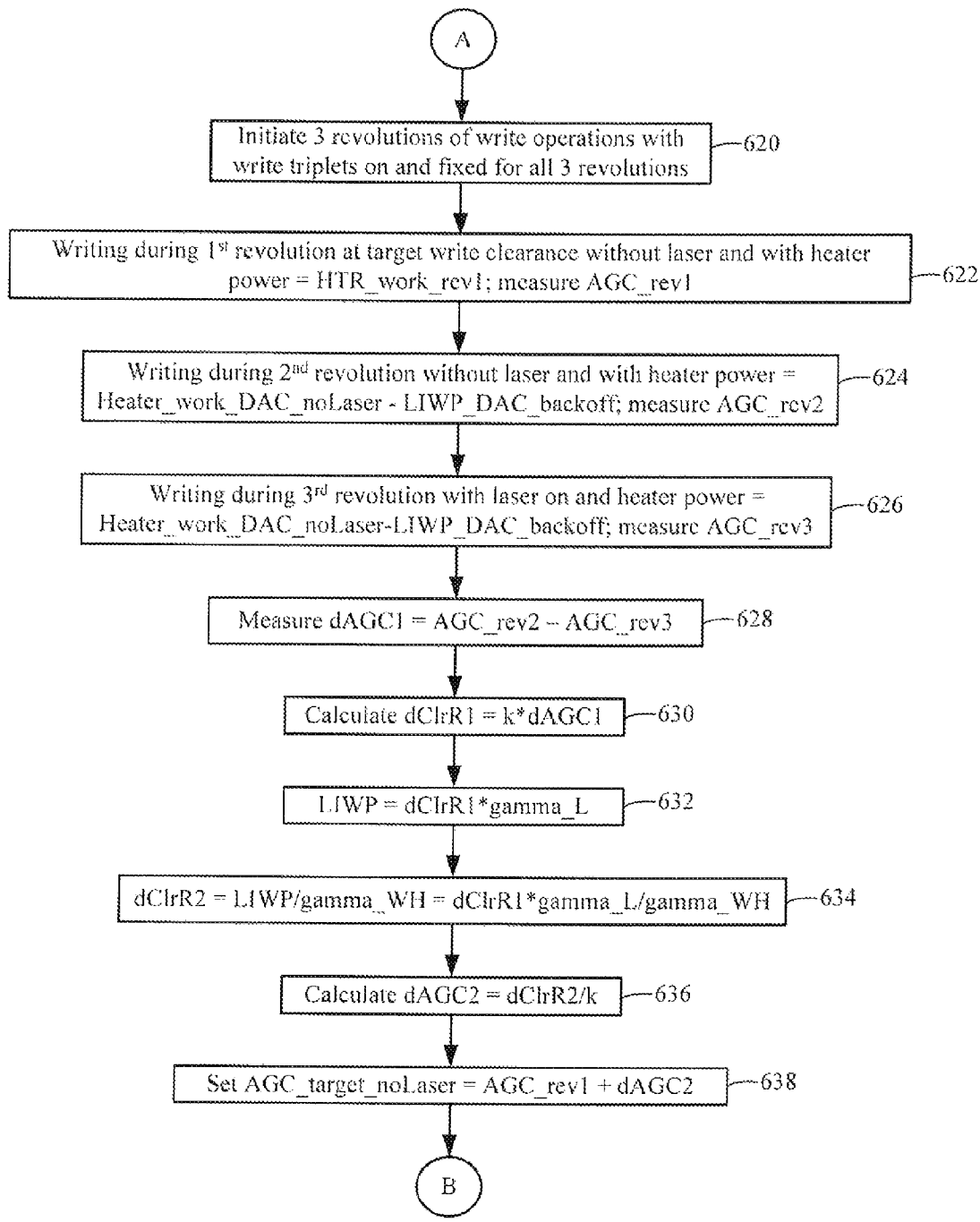
Figure 6C:
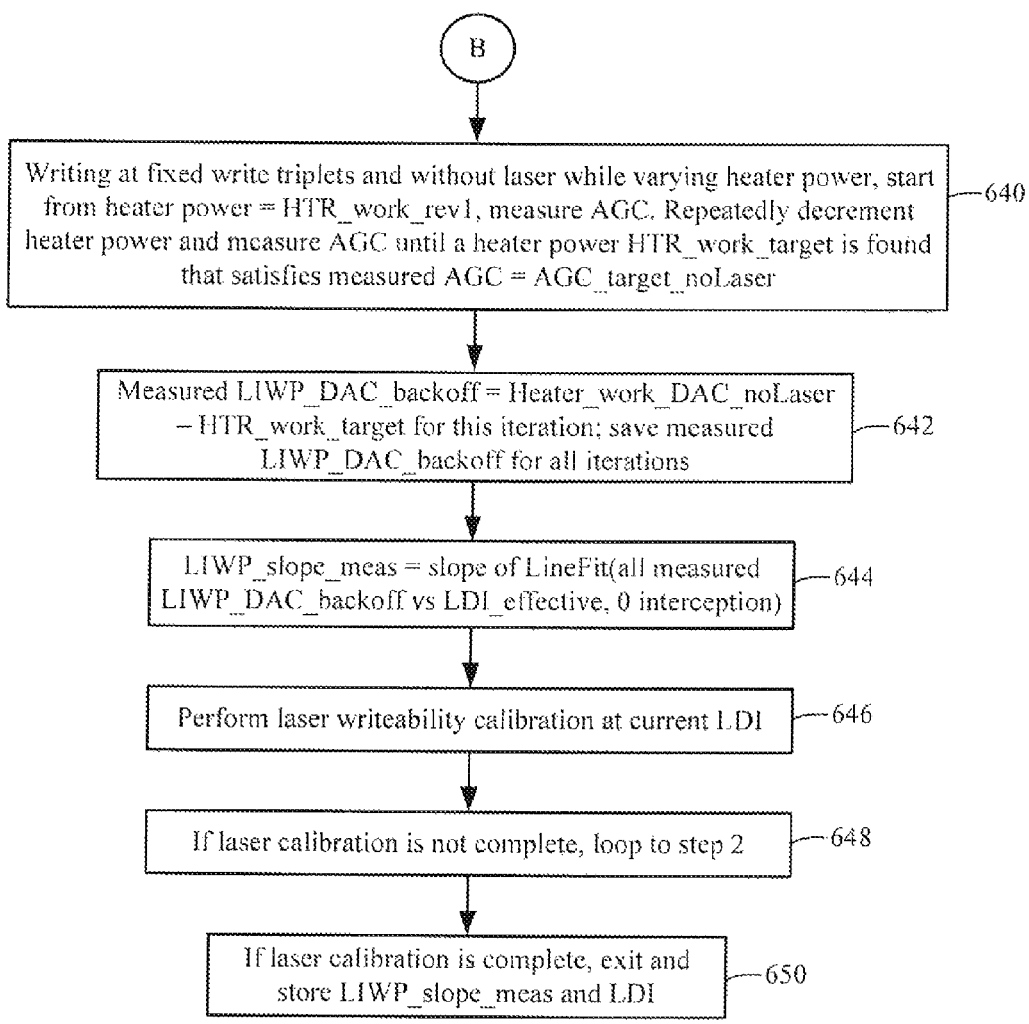

FIGS. 6A-6C illustrate a method for concurrently correcting for laser induced writer protrusion and performing laser writeability calibration for a HAMR head in accordance with various embodiments. As illustrated in FIGS. 6A-6C, correction for laser induced writer protrusion is implemented during a laser writeability calibration procedure. The method shown in FIGS. 6A-6C can be performed on a head-by-head basis and on a zone-by-zone or track-by-track basis to correct for laser induced writer protrusion during laser writeability calibration in accordance with various embodiments.

Obtaining zero clearance measurements is important when calibrating write clearance of a HAMR head. Zero clearance measurements are made when the close point (writer or reader close point) of the HAMR head contacts the surface of a magnetic recording medium. The disclosed methodologies recognize that a zero clearance measurement at the writer/NFT of a HAMR head cannot be obtained due to the inability to reliably detect contact between the NFT and the surface of the magnetic storage medium. However, a zero clearance measurement at the reader of a HAMR head can be reliably obtained. As such, the reader clearance can be used in the method shown in FIGS. 6A-6C as a basis for computing clearance at the writer/NFT, using an appropriate conversion factor (e.g., a gamma parameter).

Figure 7:
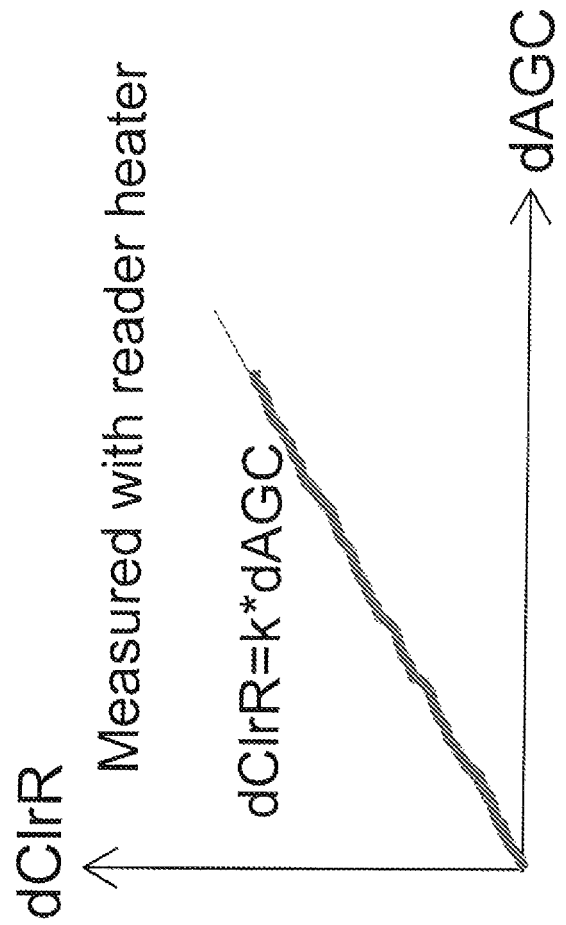
FIG. 7 is a graph showing change in reader clearance versus change in a servo automatic gain control (AGC) signal.

An initial step of the method shown in FIGS. 6A-6C (see FIG. 6A) involves calibrating reader clearance versus a servo automatic gain control (AGC) signal (step 602), an example of which is shown in FIG. 7. Power to the reader heater is varied to obtain a relationship between reader clearance (in angstroms) and AGC signal amplitude. The change in reader clearance versus the change in AGC signal can be expressed as $dClrR = k*dAGC$, where k is a constant corresponding to the slope of a linear fitting between measured dClrR and dAGC.

Laser writeability calibration generally involves incrementing (step 604) the current supplied to the laser (also referred to herein as laser diode current or LDI) and evaluating one or more performance metrics (e.g., bit error rate, track BER center offset, off-track read capability (OTC) location, and a sectors recoverable metric, for example). The LDI is generally adjusted until a desired or optimal write performance is achieved, at which point the LDI is set for normal drive operation. It is noted that laser writeability calibration occurs across the stroke of the drive, and is performed numerous times at different disk radii (e.g., different tracks and/or zones of the disk). The LIWP correction methodology shown in FIGS. 6A-6C is performed concurrently with laser writeability calibration at each LDI increment in order to determine how much writer heater power is to be reduced (writer heater backoff) to achieve a desired writer/NFT clearance (e.g., a target clearance). The writer heater reduction or backoff is used to compensate for additional protrusion at the writer/NFT region due to heating of the NFT by the laser diode (e.g., LIWP).

At the conclusion of the method shown in FIGS. 6A-6C, a curve is generated for measured writer heater backoff values (measured LIWP_DAC_backoff) versus effective laser diode current values (LDI_effective) obtained by implementing the method. It is understood that the term heater DAC refers to the amount of power supplied to a heater in terms of digital-to-analog converter values, units, or steps. The term LIWP_DAC_backoff refers to the amount of writer heater DAC value or setting adjust that is typically downwardly adjusted from the Heater_work_DAC_noLaser to compensate for heating of the writer/NFT protrusion region by the laser diode (e.g., to compensate for LIWP). Heater_work_DAC_noLaser is the writer heater power applied to set the write target clearance without laser in a similar fashion as a conventional magnetic recording system (as in rev1 discussed in FIG. 6B). After completion of a concurrent LIWP correction and laser writeability calibration methodology disclosed herein, setting the writer heater DAC to Heater_work_DAC_noLaser−LIWP_DAC_backoff for a particular laser diode current setting (LDI_effective) will cause the writer/NFT to be positioned at the desired or target clearance. The term LDI_effective represents the total laser current minus the threshold current needed to turn the laser diode on (e.g., the threshold current needed to forward bias the laser diode).

A representative curve of measured LIWP_DAC_backoff vs. LDI_effective values is shown in FIG. 15. Using the slope of the curve shown in FIG. 15, for a given laser diode current (LDI_effective) that provides the desired or optimal write performance, the writer heater power (Heater_work_DAC_noLaser−LIWP_DAC_backoff) needed to achieve the desired or target writer/NFT clearance can be determined. In the methodology shown in FIGS. 6A-6C, a curve of measured LIWP_DAC_backoff vs. LDI_effective for a given head and a given track or zone may or may not be available, as is tested at step 606.

After incrementing the value of LDI in step 604 (e.g., by 1 or a fraction of 1 mA), steps 604, 606, 608, and 610 are implemented to initially set the value of writer heater DAC. If a curve of measured LIWP_DAC_backoff vs. LDI_effective is available (e.g., the curve of FIG. 15), the writer heater DAC value for the LDI increment (in terms of LDI_effective) set in step 604 is determined using the curve. For example, the writer heater DAC value is set to Heater_work_DAC_noLaser−LIWP_DAC_backoff=Heater_work_DAC_noLaser−dDAC=Heater_work_DAC_noLaser−LIWP_slope_meas*LDI_effective (step 608). If a curve of measured LIWP_DAC_backoff vs. LDI_effective is not available, the writer heater DAC value is set using a global default LIWP coefficient (step 610), which provides a rough estimate of an appropriate writer heater DAC value for a given LDI_effective setting. In this case, the writer heater DAC value is given by Heater_work_DAC_noLaser−LIWP_DAC_backoff=Heater_work_DAC_noLaser−dDAC=Heater_work_DAC_noLaser−LIWP_slope_global*LDI_effective.

After setting the initial writer heater DAC value at step 608 or step 610, laser writeability calibration is performed at the current LDI increment (step 612). If the write performance is not acceptable at step 612, the LDI value is incremented and steps 604-612 are repeated until acceptable write performance is achieved. Assuming acceptable write performance is achieved at the current LDI setting, a check at step 614 is made to determine if the current heater LIWP_DAC_backoff value is greater than a predetermined threshold. In particular, a check is made to determine if LIWP_DAC_backoff>LIWP_thres. The predetermined threshold, LIWP_thres, represents the minimum LIWP_DAC_backoff beyond that LIWP calibration data are trustworthy. It is typically about 50% of the average LIWP_DAC_backoff when LDI is optimized. If the current LIWP_DAC_backoff value does not exceed the predetermined threshold, steps 604-616 are repeated until the predetermined threshold is exceeded. If the current LIWP_DAC_backoff value exceeds the predetermined threshold, as is tested at step 614, concurrent LIWP calibration is initiated 618.

With reference to FIG. 6B, concurrent LIWP calibration involves performing write operations for three revolutions of the magnetic recording medium, referred to as rev1, rev2, and rev3 (step 620). The write operations for rev1-rev3 are performed using the same track of the medium in a given zone. The write operations for rev1-rev3 involve energizing the writer and writer heater. More particularly, writing for rev1-rev3 is performed using fixed write triplets so that the writer is energized the same way during each of the three revolutions. More particularly, writing with a fixed write triplet refers to energizing the write coil with the same waveform (e.g., a square wave) having the same amplitude, the same overshoot amplitude, and the same overshoot duration. The write waveform amplitude, overshoot amplitude, and overshoot duration are held constant when writing for each of the three revolutions. Notably, the write operations for rev1 and rev2 are performed with the laser off (no heating of the NFT and therefore no LIWP), while the write operation for rev3 is performed with the laser on (heating of the NFT resulting in LIWP).

Figure 8:
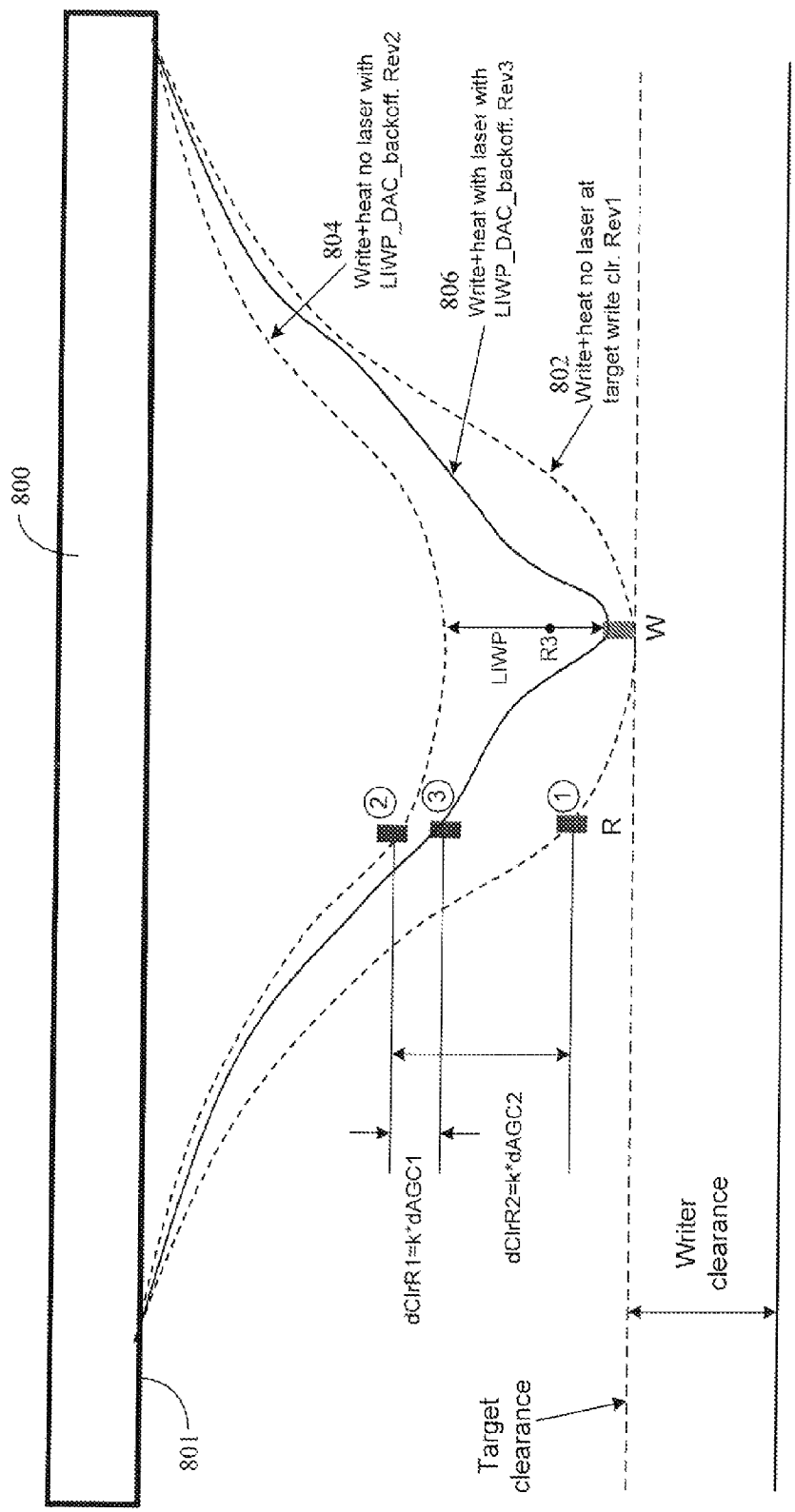
FIG. 8 shows a portion of an air bearing surface of a HAMR slider subject to protrusion, including laser induced writer protrusion, during a procedure to concurrently correct for laser induced writer protrusion while performing laser writeability calibration in accordance with various embodiments.
Figure 9:
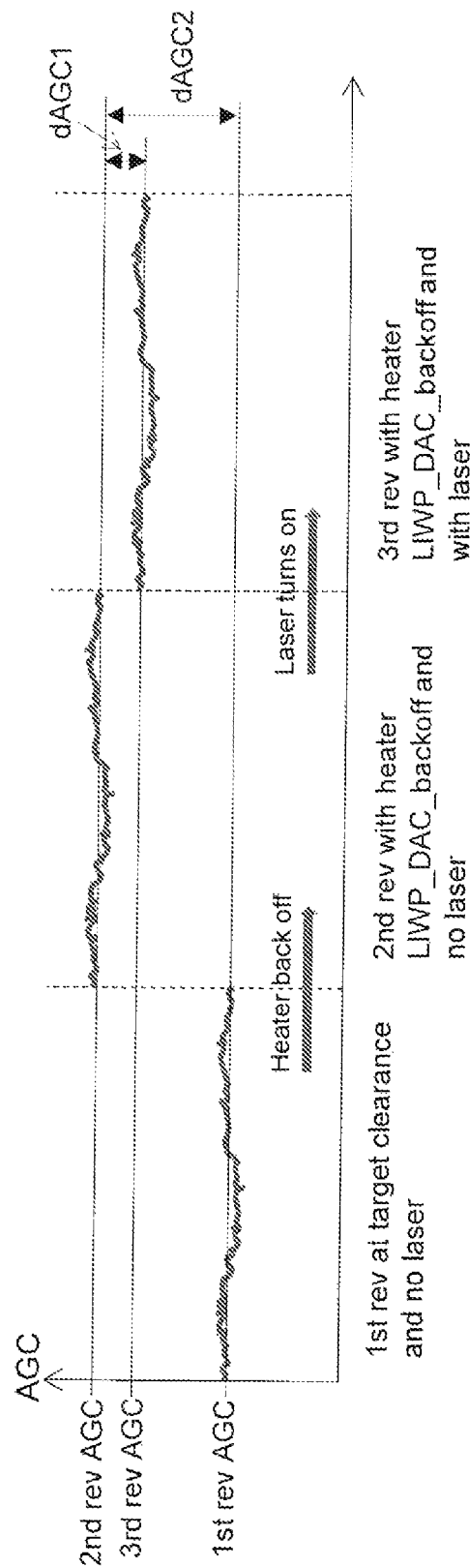
FIG. 9 shows AGC signals resulting from write operations performed for three different revolutions of a magnetic storage medium during a procedure to concurrently correct for laser induced writer protrusion while performing laser writeability calibration in accordance with various embodiments.

The method steps shown in FIG. 6B will be described with reference to FIGS. 8 and 9. FIG. 8 illustrates a portion of an air bearing surface 801 of a HAMR slider 800 which includes a writer, W, and a reader, R. The portion of the air bearing surface 801 shown in FIG. 8 is subject to protrusion due to three main heat sources when energized, namely the writer, W, the writer heater (not shown), and the NFT when the laser is on. Although not shown in FIG. 8, the NFT is positioned adjacent the writer, W. FIG. 8 shows three protrusion profiles each associated with a write operation for a different revolution (rev1, rev2, and rev3). As was discussed previously, the write operations for rev1-rev3 involve energizing the writer and writer heater, and writing with fixed write triplets. The protrusion profile 802 results when performing a write operation (step 622) for rev1 with the laser off and with the writer, W, at a target write clearance. With the writer, W, at the target write clearance, the AGC signal (AGC_rev1) is measured for rev1.

The method continues at step 624 with writing with fixed write triplets for a second revolution (rev2) without the laser on and with the writer heater DAC set at the level (Heater_work_DAC_noLaser−LIWP_DAC_backoff) determined at step 608 or 610 in FIG. 6A. The result of applying the writer heater backoff when writing during rev2 can be seen in the change (increase) in the AGC signal in FIG. 9 from rev1 to rev2. The AGC signal (AGC_rev2) is measured for rev2 at step 624. Applying the writer heater backoff when writing during rev2 results in the protrusion profile 804 shown in FIG. 8. The reduction in heat due to the reduction in the writer heater DAC setting for rev2 results in a reduction in the magnitude of the protrusion profile 804 for rev2 relative to the protrusion profile 802 for rev1.

The method continues at step 626 with writing with fixed write triplets for a third revolution (rev3) with the laser on and the writer heater DAC set at the same level as in step 624 (set at Heater_work_DAC_noLaser−LIWP_DAC_backoff). With the writer heater DAC set at Heater_work_DAC_noLaser−LIWP_DAC_backoff and the laser on, the AGC signal is measured for rev3 (AGC_rev3) at step 626. Applying the writer heater backoff when writing during rev3 with the laser on results in the protrusion profile 806 shown in FIG. 8. It is noted that the protrusion profile 806 represents the protrusion profile after completion of the LIWP correction and laser writeability calibration methodology shown in FIGS. 6A-6C. In practice, the location of the writer, W, at the start of the rev3 writing procedure (with the laser on) would more likely be at a location between that shown in FIG. 8 (W at the target write clearance) and the protrusion profile 804, such as at the location R3 shown in FIG. 8. The LIWP calibration methodology seeks to determine the writer heater DAC setting for a given laser current level that causes the writer, W, (and therefore NFT) to move to the target write clearance when the laser is turned on during normal writing operations.

Figure 10:
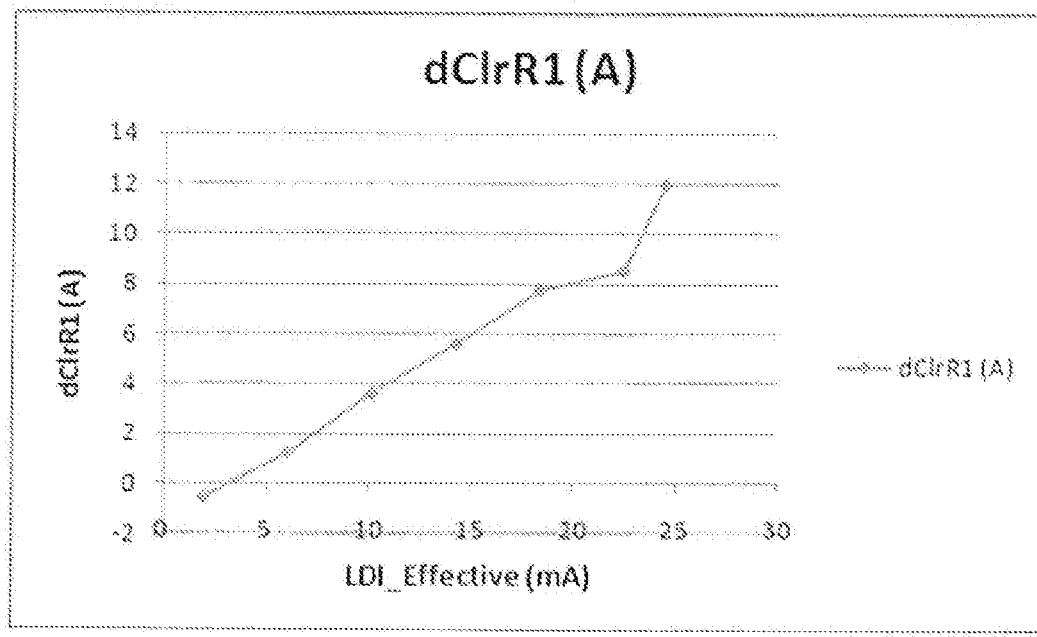
FIG. 10 is a graph showing change in reader clearance versus laser current associated with a particular step of a method for concurrently correcting for laser induced writer protrusion while performing laser writeability calibration in accordance with various embodiments.

At step 628, the change in the AGC signal from rev2 to rev3 is measured as dAGC1=AGC_rev2−AGC_rev3. This change in the AGC signal (dAGC1) from rev2 to rev3 can be seen as the change in the clearance (dClrR1) of the reader, R, in FIG. 8 from position 2 to position 3. The change in reader clearance (dClrR1) due to the change in AGC signal (dAGC1) can be calculated by setting dClrR1=k*dAGC1 at step 630, where k is the same k as in step 602. FIG. 10 is a graph showing dClrR1 (in angstroms) versus LDI_effective (in mA) for purposes of illustration. The magnitude of the laser induced writer protrusion at the writer/NFT location resulting from turning on the laser and writing with fixed write triplets during rev3 can be calculated as LIWP=dClrR1*gamma_L (step 632).

Figure 11:
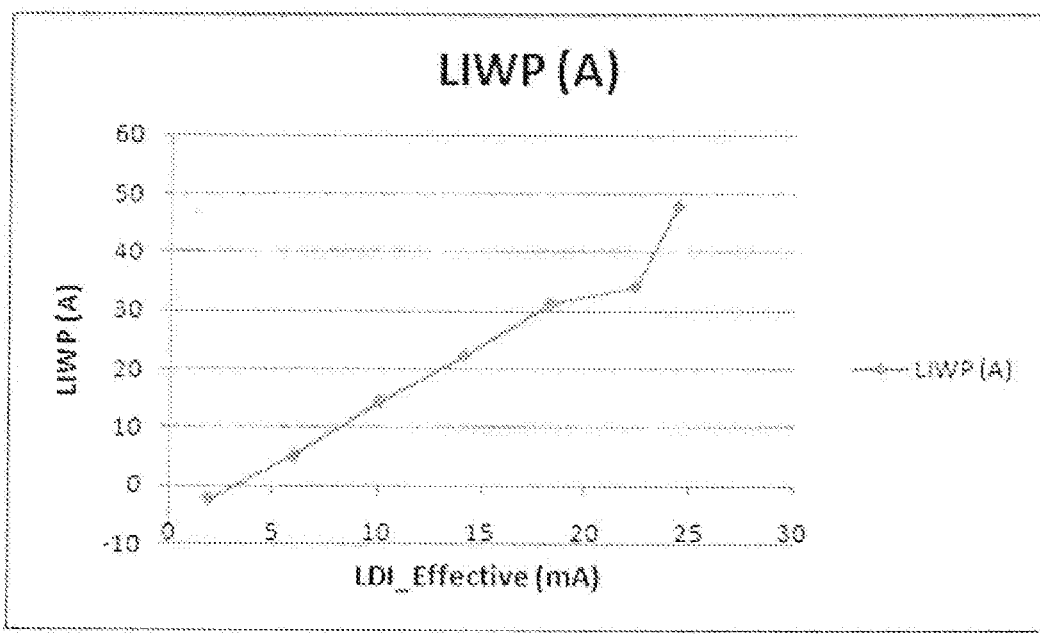
FIG. 11 is a graph showing laser induced writer protrusion versus laser current associated with a particular step of a method for concurrently correcting for laser induced writer protrusion while performing laser writeability calibration in accordance with various embodiments.

As was discussed previously, clearance for the writer, W, is based on reader clearance (see FIG. 7) due to the inability to reliably detect head-to-disk contact events (zero clearance) at the writer/NFT of a HAMR head. As such, the gamma_L parameter is used to convert reader clearance to corresponding writer clearance with high accuracy. The parameter gamma_L, which is determined at the time of HAMR head fabrication, refers to the laser induced protrusion gamma ratio at constant heater power and fixed write triplets while varying laser current (actuation at writer/reader). A graphical depiction of LIWP calculated at step 632 can be seen in FIG. 8 as the difference between the protrusion profile 806 and the protrusion profile 804. FIG. 11 is a graph showing LIWP (in angstroms) versus LDI_effective (in mA) for purposes of illustration.

Figure 12:
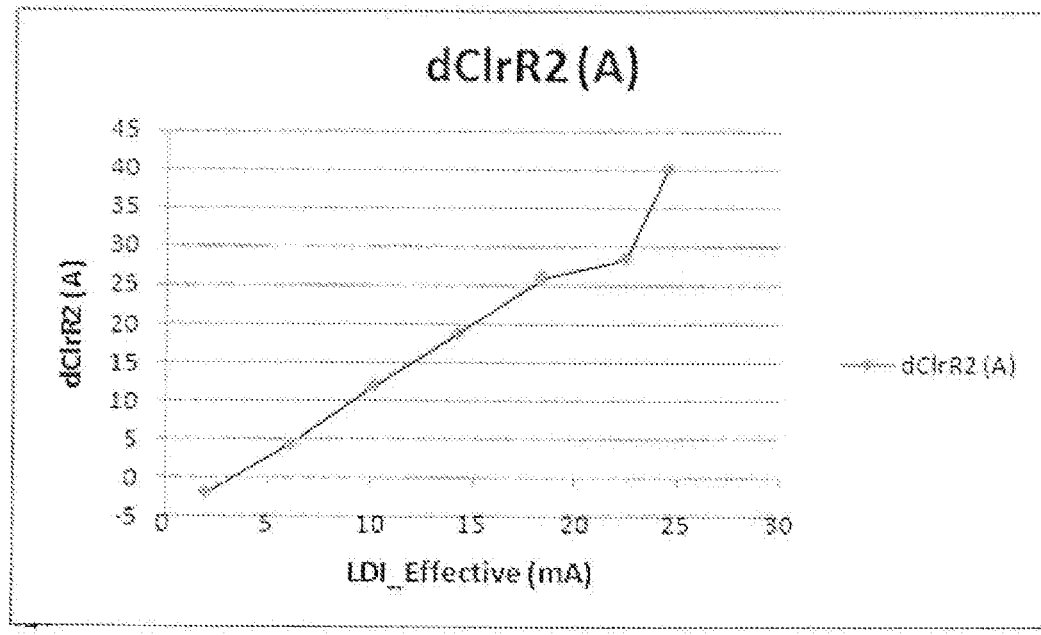
FIG. 12 is a graph showing change in reader clearance versus laser current associated with a particular step of a method for concurrently correcting for laser induced writer protrusion while performing laser writeability calibration in accordance with various embodiments.

At step 634, the change in reader clearance (dClrR2) due to the change in the AGC signal (dAGC2) from rev1 to rev2 is calculated. The AGC signal change, dAGC2, is shown in FIG. 9, and the corresponding change in reader clearance, dClrR2, is shown in FIG. 8 as the change in reader position from position 1 to position 2. In step 634, the value of dClrR2 is given by LIWP/gamma_WH=dClrR1*gamma_L/gamma_WH. The parameter gamma_WH, which is determined at the time of HAMR head fabrication, refers to the heater induced protrusion gamma ratio at fixed write triplets while varying heater power (actuation ratio writer/reader). FIG. 12 is a graph showing dClrR2 (in angstroms) versus LDI_effective (in mA) for purposes of illustration.

Figure 13:
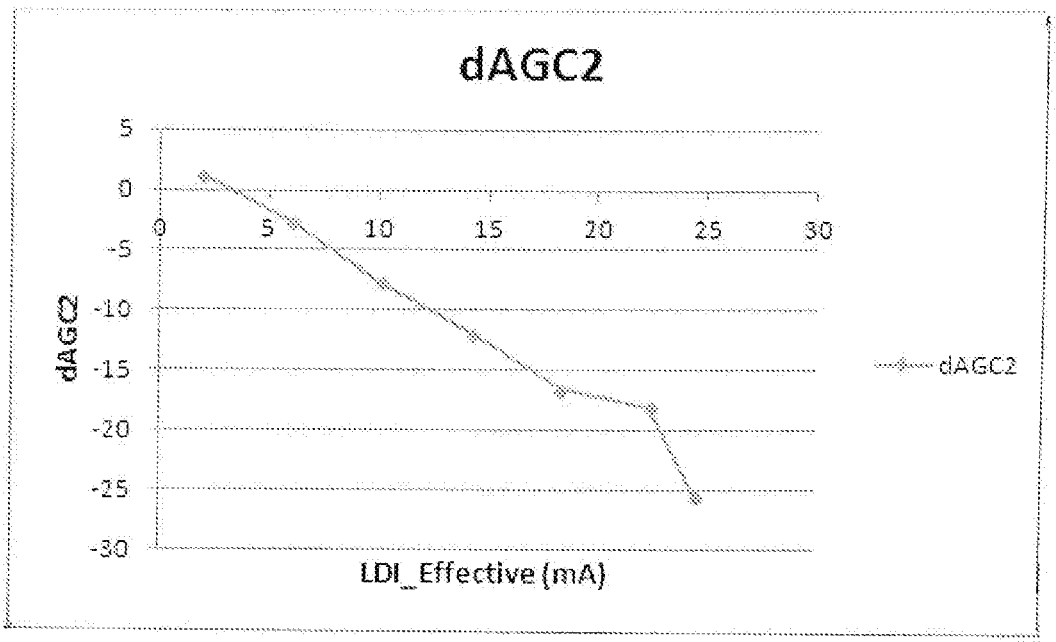
FIG. 13 is a graph showing change in AGC signal versus laser current associated with a particular step of a method for concurrently correcting for laser induced writer protrusion while performing laser writeability calibration in accordance with various embodiments.
Figure 14:
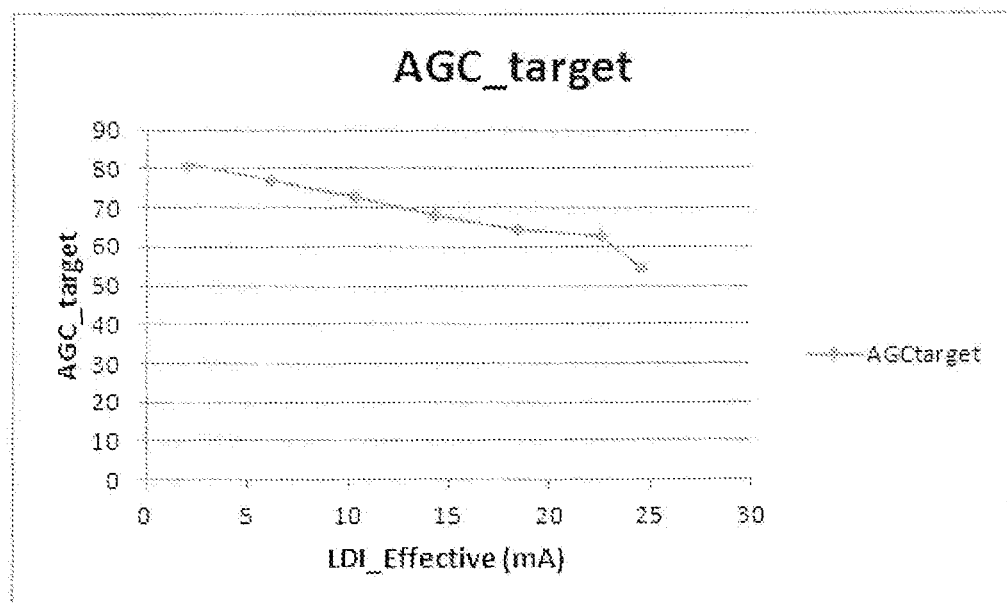
FIG. 14 is a graph showing AGC target for searching for a heater power versus laser current associated with a particular step of a method for concurrently correcting for laser induced writer protrusion while performing laser writeability calibration in accordance with various embodiments.

Having calculated dClrR2 in step 634, step 636 involves calculating dAGC2=dClrR2/k. FIG. 13 is a graph showing dAGC2 versus LDI_effective (in mA) for purposes of illustration. In step 638, an AGC target value with no laser is calculated as AGC_target_noLaser=AGC_rev1+dAGC2. FIG. 14 is a graph of the AGC target without laser for searching for a heater power that will produce AGC values reaching AGC target versus LDI_effective (in mA) for purposes of illustration. Having computed the AGC target with no laser at step 638, the writer heater power is adjusted to produce an AGC signal equal to the AGC target (AGC_target_noLaser). This process and subsequent processes are shown in FIG. 6C.

Step 640 involves writing with fixed write triplets and without the laser being on during an iterative search of writer heater power that will produce AGC value equal to AGC_target_noLaser. In step 640, a search is made for the writer heater DAC value that will produce an AGC signal equal to the AGC target with no laser (AGC_target_noLaser) calculated in step 638. The working writer heater DAC value that satisfies the search is given by HTR_work_target. In other words, HTR_work_target represents the writer heater DAC value that will produce an AGC signal equal to AGC_target_noLaser.

Step 642 involves calculating the writer heater DAC value that will result in positioning the writer, W, at the target write clearance when the laser is turned on. The writer heater DAC value in step 642 is a refined version of the parameter LIWP_DAC_backoff used in previous steps as a result of the concurrent LIWP correction and laser writeability calibration methodology. In step 642, the measured LIWP_DAC_backoff=Heater_work_DAC_noLaser−HTR_work_target for this iteration. As was discussed previously, Heater_work_DAC_noLaser is the writer heater power applied to set the write target clearance without laser in a similar fashion as a conventional magnetic recording system (as in rev1). The measured LIWP_DAC_backoff and the value of LDI_effective are saved for this and all other iterations. FIG. 15 shows measured LIWP_DAC_backoff and LDI_effective values for a number of iterations. With reference to FIG. 15, step 644 involves computing the slope of a line fit to the LIWP_DAC_backoff and LDI_effective data for a number of iterations. The slope of the curve can be computed as LIWP_slope_meas=slope of LineFit(all measured LIWP_DAC_backoff vs LDI_effective, 0 interception).

Step 646 involves performing laser writeability calibration at the current laser current increment (LDI). If read/write performance metrics are not acceptable and/or laser writeability calibration is not complete, processing returns to step 604 shown in FIG. 6A. If laser writeability calibration is complete, the concurrent LIWP correction and laser writeability calibration is exited, and the LIWP_slope_meas and LDI_effective data is stored.

Figure 16:
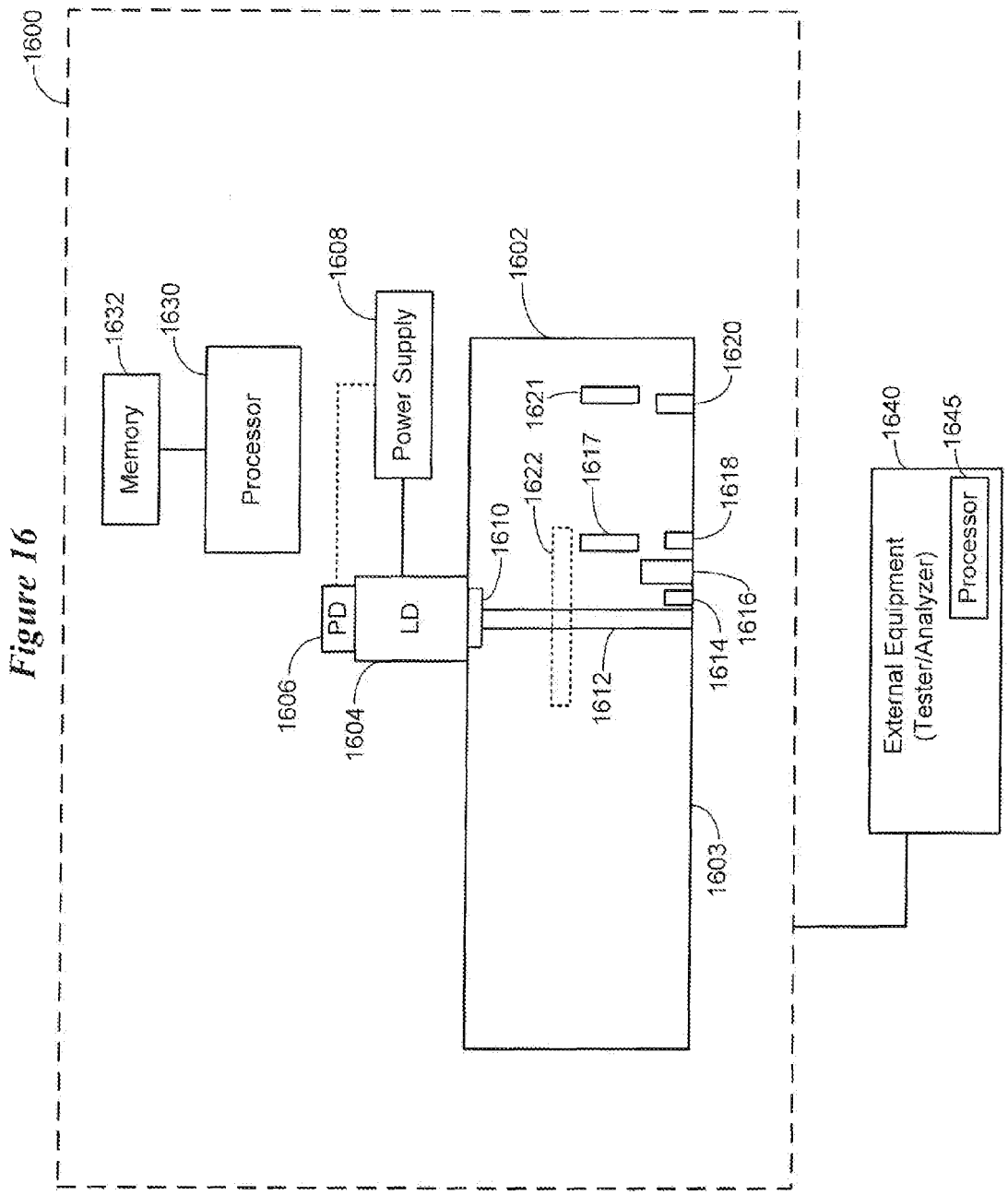
FIG. 16 is a block diagram of a system for concurrently correcting for laser induced writer protrusion and performing laser writeability calibration for a HAMR head in accordance with various embodiments.

FIG. 16 is a block diagram of a system for concurrently correcting for laser induced writer protrusion and performing laser writeability calibration for a HAMR head in accordance with various embodiments. FIG. 16 shows a portion of a HAMR drive 1600 which includes a slider 1602 upon which a laser diode 1604 is mounted. A photodetector 1606 can be mounted on or in close proximity to the laser diode 1604. A power supply 1608 is coupled to the laser diode 1604 and provides a supply current to the laser diode 1604. An output of the photodetector 1606 is coupled to the power supply 1608. The power supply 1608 can adjust the current supplied to the laser diode 1604 in response to the photodetector output.

The slider 1602 includes a number of components including an optical waveguide 1612 which is optically coupled to the laser diode 1604 via an optical coupler 1610. The optical waveguide 1612 extends from the optical coupler 1610 to an NFT 1614 situated at the air bearing surface 1603 proximate the optical waveguide 1612. In some embodiments, a bolometer 1622 is situated proximate the optical waveguide 1612. A writer 1616 is situated proximate the NFT 1614. A writer heater 1617 is situated proximate the writer 1616 and configured to thermally actuate the writer 1616 (e.g., writer pole/NFT). A contact sensor 1618 may situated proximate the writer 1616 and NFT 1614 (e.g., at a close point of the writer). A reader 1620 is shown positioned away from the writer 1616 and contact sensor 1618. A reader heater 1621 is positioned proximate the reader 1620 and configured to thermally actuate the reader 1620.

The HAMR drive 1600 further includes a processor 1630 (e.g., microprocessor or controller) coupled to a non-volatile memory 1632. The processor 1630 is configured to concurrently correct for laser induced writer protrusion and perform laser writeability calibration for the HAMR head in accordance with various embodiments. For example, the processor 1630 is configured to implement executable instructions corresponding to the flow charts discussed hereinabove. The processor 1630 can store the LIWP_DAC_backoff and LDI_effective data (and the curve shown in FIG. 15) discussed hereinabove in the memory 1632.

The processor 1630 can implement concurrent LIWP correction and laser writeability calibration in the field to monitor LIWP and health of the NFT (e.g., in response to a change in write performance). Periodically, or as the result of a specific performance-based trigger such as bits in error or channel iterations required to converge, the processor 1630 can be configured to measure LIWP at the working laser current. For example, if the measured LIWP at working laser current deviates by a specified tolerance from the factory-calibrated value, a new LIWP slope measurement may be performed, or it may serve as a trigger to recalibrate the laser current for optimal BER performance.

In some embodiments, external equipment 1640 (tester/analyzer) is coupled to the HAMR drive 1600 and used during manufacture or design development, for example. The external equipment 1640 includes a processor 1645 (or processor) which cooperates with or overrides the processor 1630 of the HAMR drive 1600. The processor 1645 of the tester/analyzer 1640 is configured to perform some or all of the functions attributed to the processor 1630 of the drive 1600 when concurrently correcting for laser induced writer protrusion and performing laser writeability calibration for a HAMR head in accordance with various embodiments.

Because the methodologies disclosed herein are based on servo AGC, the measurement is easy to make and can be done in a short time. Also, only a limited number of revolutions are employed because hundreds of servo AGC measurements are available for each revolution and can be used to calculate an average comprised of many samples. Several dedicated tracks across the stroke can be defined during the factory process to enable writing in a non-user data area.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
performing laser writeability calibration of a heat-assisted magnetic recording (HAMR) head, the head comprising a reader, a writer, a writer heater, a laser, and a near-field transducer (NFT); and
concurrently while performing the laser writeability calibration, correcting for laser induced writer protrusion (LIWP) at a writer/NFT region of the head using writer clearance calculations based on reader clearance measurements.

2. The method of claim 1, wherein making the reader clearance measurements comprises measuring a servo automatic gain control (AGC) signal.

3. The method of claim 1, wherein:
the laser writeability calibration is performed at a plurality of laser current increments; and
the LIWP correction is performed at each of the plurality of laser current increments.

4. The method of claim 1, wherein correcting for LIWP comprises determining writer heater power levels that compensate for LIWP at each of a plurality of laser current increments.

5. The method of claim 4, wherein applying the determined writer heater power levels to the writer heater at each of the laser current increments causes the writer to move to a target write clearance.

6. The method of claim 4, further comprising:
developing a curve of writer heater power levels versus laser current increments;
using the curve to determine a particular writer heater power level that corresponds to a particular laser current increment; and
setting the writer heater power level for the head to the particular writer heater power level during normal write operations.

7. The method of claim 1, wherein correcting for LIWP comprises performing write operations with and without current applied to the laser.

8. The method of claim 7, wherein performing the write operations comprises writing with fixed write triplets for each of the write operations.

9. The method of claim 8, wherein performing the write operations to a magnetic recording medium comprises:
during a first revolution of the medium, writing at a target write clearance with the writer heater at an initial power level and the laser off, and measuring a first reader clearance;
during a second revolution of the medium, writing with the laser off and the writer heater power level reduced from the initial power level to a backoff power level, and measuring a second reader clearance; and
during a third revolution of the medium, writing with the laser on with the writer heater power at the backoff power level, and measuring a third reader clearance.

10. The method of claim 9, further comprising calculating LIWP at the writer/NFT region using the second and third reader clearances and a predetermined laser induced protrusion gamma ratio parameter (gamma_L).

11. The method of claim 10, further comprising:
writing with fixed write triplets without the laser; and
determining a compensating writer heater backoff power level that compensates for the calculated LIWP.

12. The method of claim 11, further comprising performing laser writeability calibration at the current laser current increment and with the writer heater power set at the compensating writer heater backoff power level.

13. An apparatus, comprising:
a heat-assisted magnetic recording (HAMR) head comprising a reader, a writer, a writer heater, a laser, and a near-field transducer (NFT); and
a processor coupled to the head, the processor configured to:
perform laser writeability calibration of the head; and
concurrently while performing the laser writeability calibration, correct for laser induced writer protrusion (LIWP) at a writer/NFT region of the head using writer clearance calculations based on reader clearance measurements.

14. The apparatus of claim 13, wherein the head and the processor are components of a HAMR hard drive.

15. The apparatus of claim 13, wherein the processor is integral to a test system communicatively coupled to the head.

16. The apparatus of claim 13, wherein the processor is configured to make the reader clearance measurements by measuring a servo automatic gain control (AGC) signal.

17. The apparatus of claim 13, wherein the processor is configured to:
perform the laser writeability calibration at a plurality of laser current increments; and
perform LIWP correction at each of the plurality of laser current increments.

18. The apparatus of claim 13, wherein the processor is configured to determine writer heater power levels that compensate for LIWP at each of a plurality of laser current increments.

19. The apparatus of claim 18, wherein the processor is configured to apply the determined writer heater power levels to the writer heater at each of the laser current increments to cause the writer to move to a target write clearance.

20. The apparatus of claim 18, wherein the processor is further configured to:
develop a curve of writer heater power levels versus laser current increments;
use the curve to determine a particular writer heater power level that corresponds to a particular laser current increment; and
set the writer heater power level for the head to the particular writer heater power level during normal write operations.

* * * * *